United States Patent
Straub et al.

(10) Patent No.: US 11,797,427 B2
(45) Date of Patent: Oct. 24, 2023

(54) AUTOMATIC GENERATION OF UNIT TESTS WHILE RUNNING AN APPLICATION

(71) Applicant: Oracle International Corporation, Redwood Shores, CA (US)

(72) Inventors: Christian Straub, Palo Alto, CA (US); Hugh Zhang, Foster City, CA (US); Diego Frabotta, Walnut Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 16/687,298

(22) Filed: Nov. 18, 2019

(65) Prior Publication Data
US 2020/0371903 A1   Nov. 26, 2020

Related U.S. Application Data

(60) Provisional application No. 62/851,514, filed on May 22, 2019.

(51) Int. Cl.
*G06F 11/36* (2006.01)
(52) U.S. Cl.
CPC ........ *G06F 11/3688* (2013.01); *G06F 11/368* (2013.01); *G06F 11/3664* (2013.01)
(58) Field of Classification Search
CPC ....... G06F 11/36–3696; G06F 11/3688; G06F 11/3664; G06F 11/368
See application file for complete search history.

(56) References Cited

U.S. PATENT DOCUMENTS 9,665,350 B1 * 5/2017 Kalmar ............... G06F 11/3676
2007/0180096 A1 * 8/2007 Roth .................... H04L 41/5038
709/223

(Continued)

OTHER PUBLICATIONS

Gittens, Mechelle, et al. "Focused iterative testing: a test automation case study." Proceedings of the 1st international workshop on Testing database systems. 2008. (Year: 2008).*

(Continued)

*Primary Examiner* — Kevin L Young
*Assistant Examiner* — Joanne G Macasiano
(74) *Attorney, Agent, or Firm* — Trellis IP Law Group, PC

(57) ABSTRACT

Implementations generally relate to software testing system and method for automatically generating, deploying, and monitoring software tests employed to test software applications and/or software process flows. In implementations, a system generates software application tests and varies such tests used based on several criteria including monitoring a software application processing defined inputs and outputs to determine which parts of the application are being tested, which parts of the software application are not being tested, user interactions, metadata, type of software application, use computing environment, etc. The system may be configured to adapt testing, either pre or post production, to allow, user interactions of one or more running software applications to be used to provide feedback on which additional tests to add and/or subtract automatically to testing sequences. Moreover, data gathering techniques such as crowd source data sampling, statistical sampling, and the like, may be employed as additional input to the system.

20 Claims, 15 Drawing Sheets

(56) References Cited

U.S. PATENT DOCUMENTS

| | | | | |
|---|---|---|---|---|
| 2009/0144698 | A1* | 6/2009 | Fanning | G06F 11/3676 |
| | | | | 717/120 |
| 2009/0265693 | A1* | 10/2009 | Bakowski | G06F 11/3688 |
| | | | | 717/131 |
| 2009/0307763 | A1* | 12/2009 | Rawlins | G06F 11/3672 |
| | | | | 726/5 |
| 2013/0080834 | A1* | 3/2013 | Sakai | G06F 11/3696 |
| | | | | 714/32 |
| 2015/0331779 | A1* | 11/2015 | Subramaniam | G06F 11/368 |
| | | | | 717/124 |
| 2016/0070641 | A1* | 3/2016 | Printz | G06F 11/3692 |
| | | | | 717/124 |
| 2016/0314062 | A1* | 10/2016 | Pedro de Castro | |
| | | | | G06F 11/3684 |
| 2016/0350207 | A1* | 12/2016 | Cmielowski | G06F 11/3684 |
| 2017/0046253 | A1* | 2/2017 | Ganda | G06F 11/3692 |
| 2018/0109781 | A1* | 4/2018 | Bruce-Smith | H04N 17/00 |
| 2020/0073790 | A1* | 3/2020 | Abhishek | G06F 11/3612 |

OTHER PUBLICATIONS

Aman et al. "A Topic Model and Test History-Based Test Case Recommendation Method for Regression Testing". In: 2018 IEEE International Conference on Software Testing, Verification and Validation Workshops (ICSTW). Apr. 2018, pp. 392-397 (Year: 2018 ).*

* cited by examiner

AUTOMATIC GENERATION OF UNIT TESTS WHILE RUNNING AN APPLICATION

CROSS REFERENCES TO RELATED APPLICATIONS

This application claims the benefit of U.S. Provisional Patent Application Ser. No. 62/851,514, entitled AUTOMATIC GENERATION OF UNIT TESTS WHILE RUNNING AN APPLICATION, filed on May 22, 2019 (ORACP0248P/ORA190475-US-PSP), which is hereby incorporated by reference as if set forth in full in this application for all purposes.

BACKGROUND

The following relates to software application testing. More particularly, the following related to the generation of software tests and testing processes.

Conventional software testing often looks at testing code by analyzing the number of lines of code executed in a given execution path to give, for example, developers, who then use the date to generate a finite number of testing processes to validate the code for a finite set of expected inputs. Unfortunately, there is often a large variation in inputs that may be applied to the software by end users leading to untested code paths. In addition, some third party users of the code may employ an extended code set for services that are difficult, if not impossible to test prior to code release to end users. Such untested code paths and untested extended code paths may lead to end use failure of the software.

The industry has attempted to solve this issue by recording user keystrokes, mouse clicks, etc. Unfortunately, due to the variation in user interactions, such recordings are often too brittle to be useful as they are often User Interface (UI) dependent, test the UI primarily, and not necessarily the code paths, and therefore are generally not intrinsically helpful to determine issues with the production code. As such, such recordings are mainly used for acceptance testing versus unit testing.

Therefore, what is needed it a system and method that provides for robust software testing which is designed with an introspective testing capability configured to actively analyze and modify software testing tests and processes as needed in order to increase testing accuracy and reduce software application failures.

SUMMARY

Implementations generally relate to software testing system and method for automatically generating, deploying, modifying, and monitoring software tests and testing flows employed to test software applications. As described in more detail herein, one or more signals may be accepted to initiate generation of and vary software application tests and testing flows based on several criteria including monitoring a software application process flows processing one or more defined input and output tests to determine which parts of the software application are being tested, which parts of the software application are not being tested, user interactions, metadata, type of software application, user environment, etc. The system may be configured to adapt tests and testing flows as needed, either pre or post production, to allow, for example, user interactions to be used to provide feedback on which additional tests to add and/or subtract automatically to a testing sequence. Moreover, data gathering techniques such as crowd source data sampling, statistical sampling, and the like, may be employed as additional input to the system.

In other implementations, the software testing system and method may be configured with an adjustable error tolerance that may be used to help vary or adjust the testing sequences and tests in response to context data and other data. Such adjustable error tolerance may be used to set tolerance thresholds that when crossed, for example, add additional tests, remove tests, modify tests, change a sequence of testing, etc., relative to criteria such as processor efficiency needs, false alarm tolerance, frequency of errors, types of errors, and the like.

A further understanding of the nature and the advantages of particular embodiments disclosed herein may be realized by reference of the remaining portions of the specification and the attached drawings.

DETAILED DESCRIPTION

Implementations generally relate to software testing systems and methods for automatically generating, deploying, and monitoring software tests employed to test software applications. In one implementation, the software testing system generates and varies software application tests and testing process scenarios for a set of defined software process flows or tasks also referred to as "Action Chains," described herein, based on several criteria including feedback from monitoring software applications processing one or more defined input and output tests to determine which parts of the application are being tested, which parts of the software application not being tested, user interactions, metadata, type of software application, use environment, etc.

The software testing system may be configured to adapt testing as needed, either pre or post production, to allow, for example, user interactions to be used to provide feedback on which additional tests to add and/or subtract automatically to a testing sequence. Moreover, data gathering techniques such as crowd source data sampling, statistical sampling, and the like, may be employed as additional input to the system. The resulting adaptation may be used to help prevent software failures for software in use, or yet to be implemented, as well as help prevent failures due to software regression, where failures occur in software once tested and approved due to, for example, updates in the software application, also referred to herein as "software" or "application."

Figure 1:
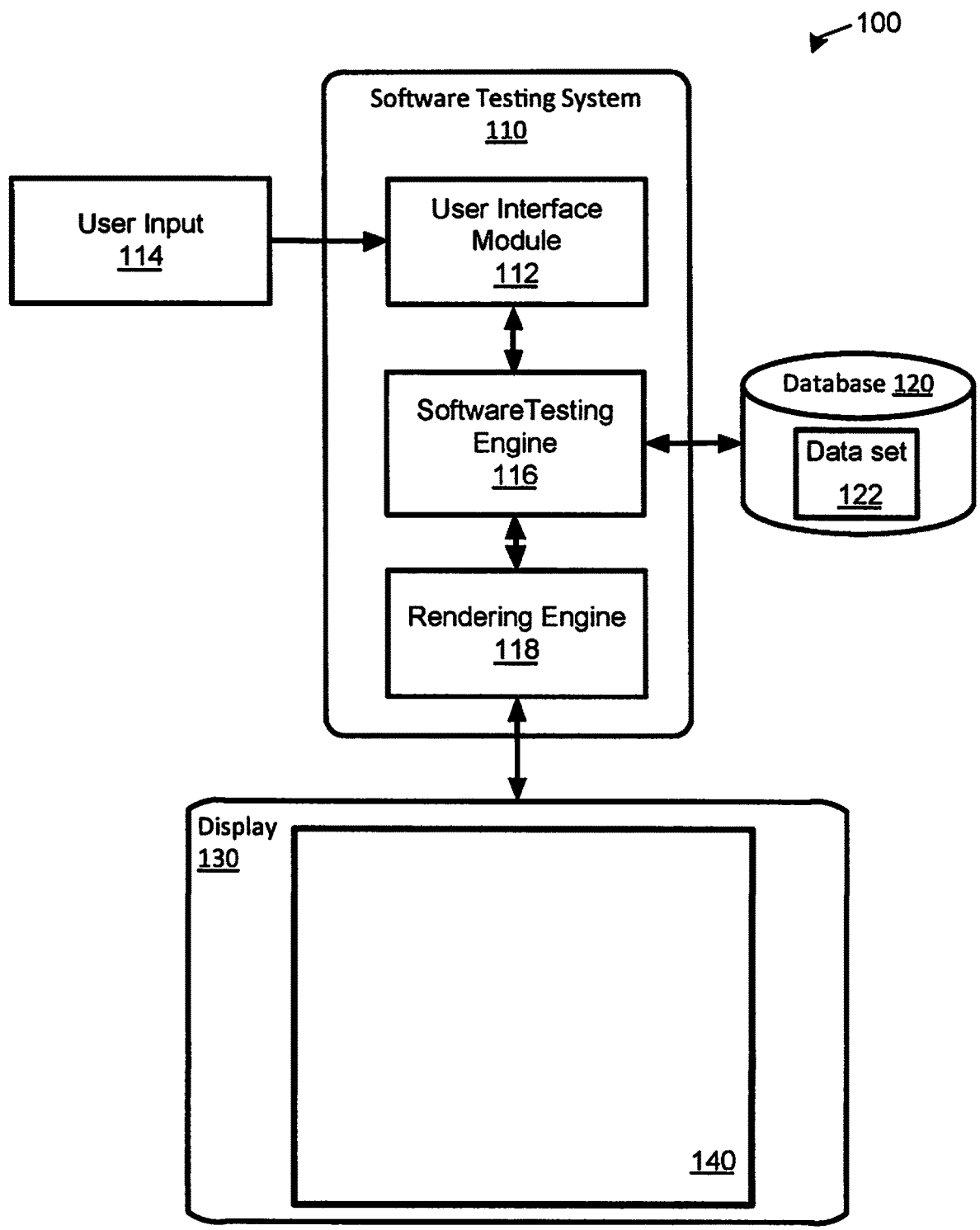
FIG. 1 is a high level illustration of a computing system used for enabling software testing.

FIG. 1 is a high-level block diagram of an exemplary computing system 100 for generating testing processes. Computing system 100 may be any computing system, such as an enterprise computing environment, client-server system, and the like. Computing system 100 includes software testing system 110 configured to process data received from a user interface 114, such as a keyboard, mouse, and/or external data sources, computing environments, etc., with regard to processes such as software testing, software test monitoring, generating software tests, configuring, modeling, labeling, data binding, maintenance, etc., associated with data elements, information, and the like as described herein.

Note that the computing system 100 presents a particular example implementation, where computer code for implementing embodiments may be implemented, at least in part, on a server. However, embodiments are not limited thereto. For example, a client-side software application may implement software testing system 110, or portions thereof, in accordance with the present teachings without requiring communications between the client-side software application and a server.

In one exemplary implementation, software testing system 110 may be connected to display 130 configured to display data 140, for example, to a user thereof. Display 130 may be a passive or an active display, adapted to allow a user to view and interact with graphical data 140 displayed thereon, via user interface 114, such as a graphical user interface (GUI). In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user, for example, to monitor software applications, process flows, testing sequences, cloud based systems, convert data, model testing, mock up software functions and/or logic, analyze, simulate processes, deploy tests, maintain data 140, etc.

In some implementations, computing system 100 may include a data source such as database 120. Database 120 may be connected to software testing system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to testing software, monitoring, analyzing, data attributes, data models, data structures, data hierarchy, nodal positions, values, value types, summations, visualizations, algorithms, code (e.g., JSON, JavaScript, XSD, XML, etc.), source, security, hashes, and the like. In addition, data sets 122 may also contain other data, data elements, and information such as metadata, labels, mockup information, development-time information, run-time information, user configuration information, API, interface component information, library information, error threshold data, simulation data, pointers, and the like.

Software testing system 110 may include user interface module 112, software testing engine 116, and rendering engine 118. User interface module 112 may be configured to receive and process data signals and information received from user interface 114. For example, user interface module 112 may be adapted to receive and process data from user input associated with data 140 for processing via software testing system 110.

In exemplary implementations, software testing engine 116 may be adapted to receive data from user interface 114 and/or database 120 for processing thereof. In one configuration, software testing engine 116 is a software engine configured to receive and process input data, such as software process flows, e.g., action chains, software tasks, etc., from a user thereof pertaining to data 140 from user interface module 114 and/or database 120 in order to, for example, test, monitor, balance, and/or assess software testing relative to one or more system performance thresholds, user simulation thresholds, error thresholds, etc. For example, during a software testing process, software testing engine 116 may compare user software interactions relative to other defined software interactions and/or one or more base interaction models in order to suggest and/or automatically enable variations to software testing and/or the testing flows and processes.

Moreover, software testing engine 116 may be used to determine whether errors found in the software under test are within acceptable levels, where some software error thresholds may be set for benign errors and/or for other types of user and/or system acceptable errors, thereby providing for an adjustable test system error tolerance.

For example, software testing engine 116 may allow for software errors with an acceptable threshold level of errors, such as errors of certain types, acceptable errors, reference errors, and the like. Software testing engine 116 may also be used to correct and resolve such errors or on the fly, with or without warnings given to a user thereof, in a recursive manner, for example, by using techniques such as increasing or decreasing simulation testing when software errors are increasing or decreasing.

Software testing engine 116 in other implementations may be configured as a data analysis tool to perform analysis functions associated with data 140. Such analysis functions may include determining the attributes associated with data 140, determining the type of data, determining the values of the data, data types, determining variables, determining the relationships to other data, interpreting metadata associated with the data, determining error types, tolerance data, and the like.

For example, software testing engine 116 may be configured to receive and analyze data sets 122 to determine testing values, key/value pairs, string identifiers, data properties, types of errors, error tolerance levels, user interface configuration, definitions, data processing instructions, data attributes, data hierarchy, nodes, nodal positions within the hierarchy, values, data type, summations, algorithms, source, security, hashes, and the like, associated with data sets 122.

Software testing engine 116 may receive existing data sets 122 from database 120 for processing thereof. Such data sets 122 may include and represent a composite of separate data sets 122 and data elements pertaining to, for example, organizational data, which may include data such as employment data, salary data, personnel data, and the like. In addition, data sets 122 may include other types of data, data elements, and information such as metadata, contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122 associated with data 140. In one implementation, upon receiving instruction from a user, for example, through user interface 114, rendering engine 118 may be configured to generate a real-time display of interactive changes being made to data 140 by a user thereof.

Figure 2:
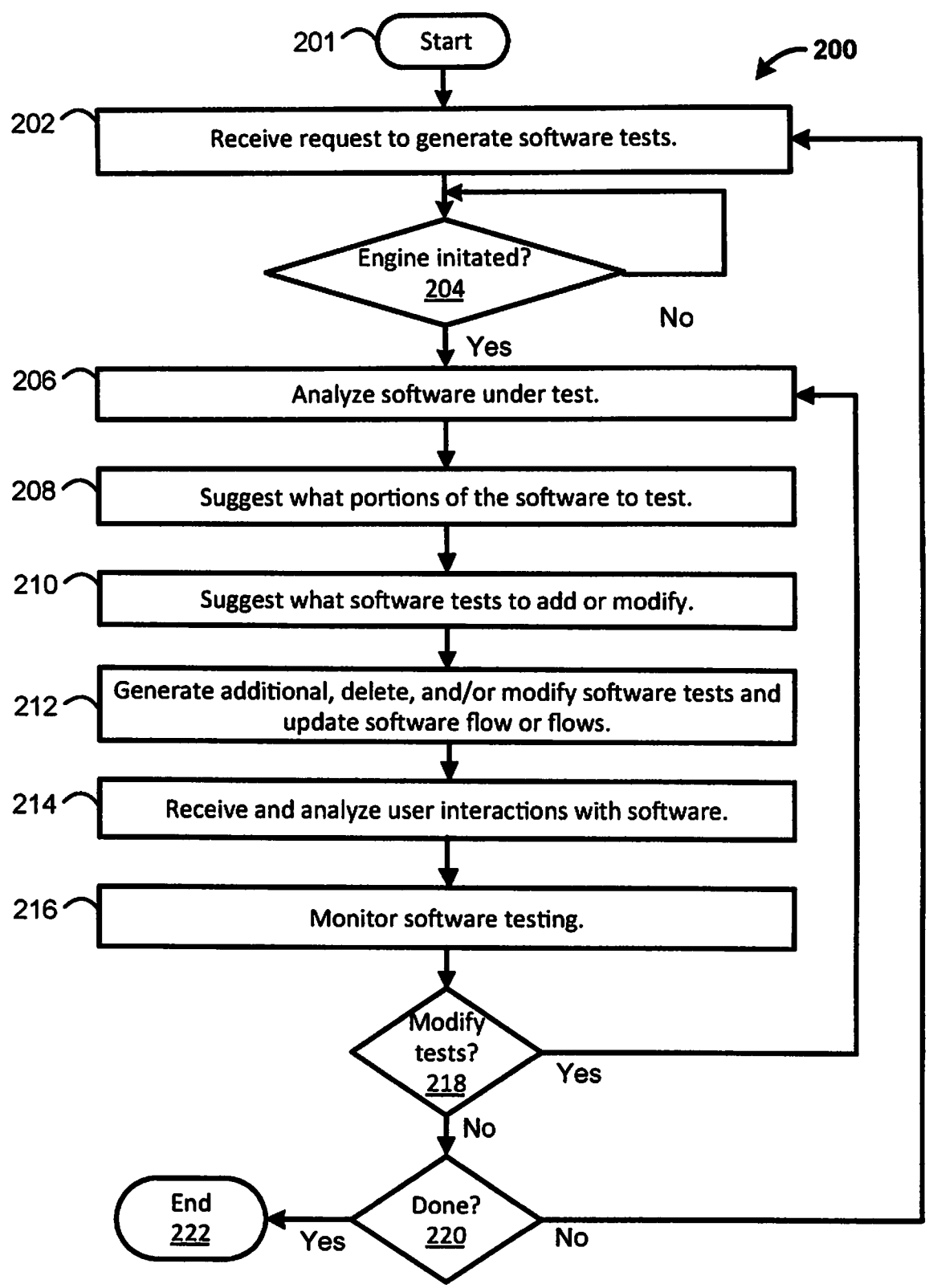
FIG. 2 is a high-level flow diagram of a method for testing software.

FIG. 2 is a high-level flow diagram of a method 200 for testing software process flows, such as "action chains," software tasks, and the like. After initialization at 201, at 202, a system such as software testing system 110 may obtain user input from, for example, user input 114, or the like, providing a UI, etc. for accepting input to generate software tests that test software process flows. At 204, method 200 determines whether an engine 204, such as software testing engine 116, has been initiated. If so, method 200 proceeds to 206. If not, method 200 returns to 204.

At 206, method 200 analyzes software process flows, e.g., software application code, action chains, tasks, logic, etc., being tested to determine what portion or portions of the software is being properly tested, overly tested, not being tested, or insufficiently tested. For example, a software application under test may be tested with defined inputs for an expected output. However, since software may have many combinations of inputs, there may not be a known output for every set of combinations of inputs resulting in some portions of the software not being tested, or being insufficiently tested, for at least some combination of inputs. In addition, since some input and output logic elements are well defined and robust, requiring little testing, some portions of the software may unnecessarily and/or overly tested relative to the type of logic being employed in the software.

In some implementations, method 200 may be configured to analyze other aspects of the software being tested, and other data, such as user use context data, to determine what portions of the software are not being tested. For example, method 200 may analyze a software process flow with a set of actual user device inputs, interactions, motions, etc., e.g., values, parameters, keystrokes, mouse movements, jiggles, etc., recorded and/or input in real time by a user to the software logic with defined outputs to determine which portions of the software are not being tested, overly tested, or that are being insufficiently tested, based on, for example a threshold and/or expected level of testing. In implementations, user context may be crowd sourced from a plurality of different users interacting with the software to determine a partial and/or overall user context.

At 208, method 200 may employ the data gathered about which portions of the software are being tested and other data to make suggestions as to what portions of the software should be tested, which portions of the software should have increased testing, and which portions of the software should be tested less. For example, for a UI function having a simple logic, extensive testing of such UI function may not be necessary to make sure that the logic is performing adequately. However, for other functions that have a more complex set of logical flows, more testing, and/or different types of testing may be required to fully test such other functions.

At 210, method 200 may employ the data gathered about which portions of the software are being tested and other data to make suggestions as to what additional tests, if any, to add, to modify, and/or which tests to delete from the testing software process flow. For example, for a UI check box function having simple logic, additional testing of such check box function may not be necessary to make sure that the check box is performing adequately. However, for other functions, such as multifunction drop down menus that have a more complex set of logical flows (e.g., a higher level of logic complexity), more testing, and/or different types of testing may be required to fully test such other functions.

In some implementations, method 200 may look to the data processing capability and/or efficiency of the software testing system 100 to determine whether to reduce or increase software tests. For example, where processing capability and/or efficiency is reduced by having a device, such as a mobile device having limited processing capability, performing such software testing, method 200 may reduce the need for some portion of the software tests. In contrast, where processing capability and/or efficiency is increased by having a device, such as a distributed Cloud processing system, performing such software testing, method 200 may increase the number of software tests.

Software testing flows and the number of software tests of software processes and tasks may also be influenced by the length of time with respect to, for example, individual software tests and/or the aggregate software testing time. As such, method 200 may be configured to be responsive to one or more test processing time limits. For example, a user may specify the length of time a particular series of tests is allowed to take which then method 200 uses to help adjust software tests and testing flows.

At 212, in response to analyzing such gathered data, method 200 generates, modifies, and/or deletes software tests as needed, and updates the current software testing flows being used to test the software process flows.

At 214, method 200 analyzes user interaction aspects of one or more deployed instantiations of the software to determine whether the software has bugs, which portions of the software are over or underutilized, software efficiency, which portions of the software need additional testing or less testing, etc.

At 214, method 200 monitors the outputs of the software under test using the updated testing flows.

At 218, in response to output data received from the updated software process flows and the user interactions and output results thereof, method 200 determines whether to modify the testing software process flows. If the software tests and/or testing flows need to be modified, then method 200 returns to 206. If not, method 200 proceeds to 220.

In implementations, method 220 may be configured with one or more test fault tolerance levels which may be employed to allow for testing faults that are within one or more fault thresholds, tolerance levels, are innocuous, benign, or otherwise ignorable. For example, applying an input to a logic element that would not change the output as the logic element is latched to a particular state may be ignored by method 200 as a benign input error with no output error. In other words, method 200 may be configured to tolerate a range of testing errors relative to one or more testing error thresholds and/or values.

At 220, method 200 determines whether the session is finished or there is another software process flow, e.g., action chain, to test and/or whether to retest the current software process flow. If not, method 200 returns to 202. If so, method 200 ends at 222.

Figure 3A:
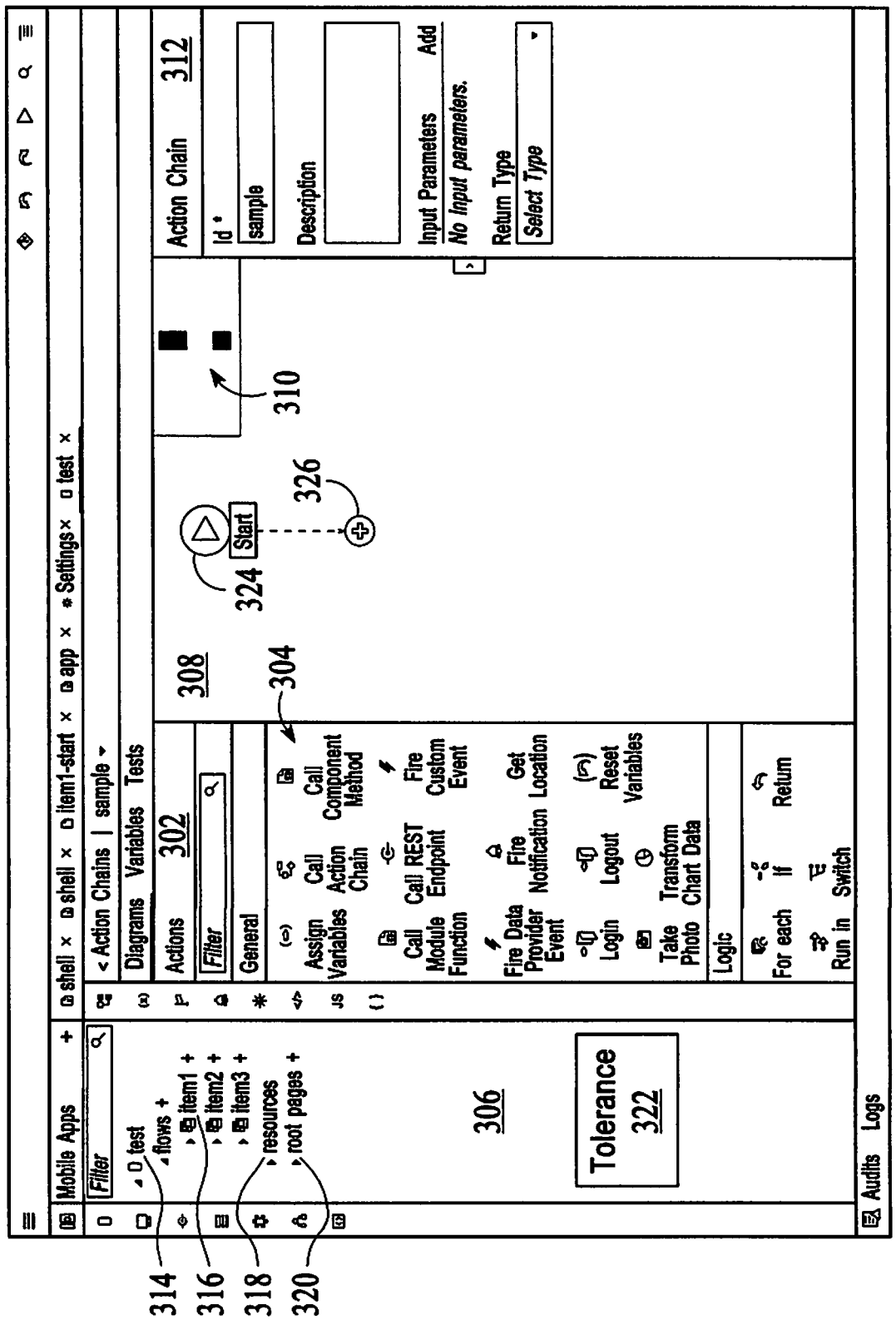
FIG. 3A illustrates a high-level user interface in a first state for testing software process flows.

FIG. 3A illustrates a high-level user interface 300 in a first state for creating and testing software process flows. UI 300 includes a nodal selection portion 302 that includes a number of nodes 304, test object portion 306, process flow area 308 illustrating software process flows (e.g., action chains), overview area 310, process flow data portion 312, and tolerance control 322. In implementations, node selection portion 302 may be configured as a drag-and-drop pallet where nodes 304 may be selected by a user, using for example, a mouse, and "dropped" into flow area 308.

Nodes 304 may include any number and type of actions, calls, functions, logic, etc. that may be used as part of an application process flow. For example, as illustrated, nodes 304 may include any number of general nodes, such as "assigning variables," "call action chain," "call component method," "call module function," call Representational State Transfer (REST) endpoint," etc. and logic functions such as "for each," "if," "return," etc. that may be used as nodes in an "action chain" testing software process flow as described herein.

Test object area 306 may be configured to show which item or items, such as a device UI, are under test. For example, mobile device UI 314 under test may have several software process flows 316, resources 318, and root pages 320, which may be needed to perform testing on the mobile device UI 314.

Flow area 308 may provide an interactive visual canvas for a user to construct and initiate one or more software processes of connected nodes 304, which may be referred to as an "action chain" or "action chains" for multiple software processes and tasks. For example, as illustrated, nodes 304 may be added to software process flow 324 using "plus" node 326.

Figure 3B:
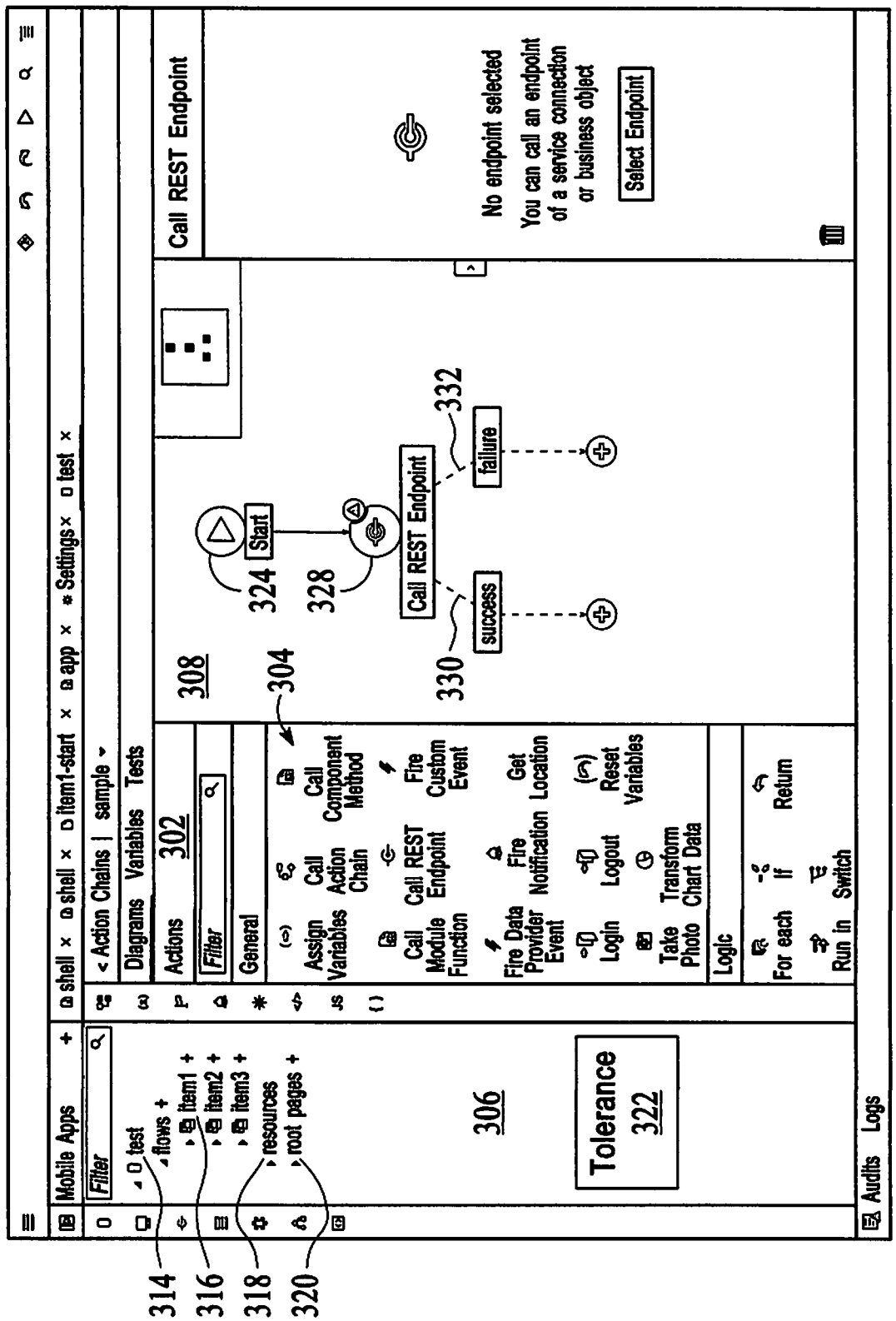
FIG. 3B illustrates a high-level user interface in a second state for testing software process flows.

FIG. 3B illustrates a high-level user interface 300 in a second state for testing software process flows. As illustrated, a node 304 from node selection portion 302, call REST endpoint node 328, is added to software process flow 324. In this instance, adding call REST endpoint node 328 is added to get data, creating two software process flow logic branches, success branch 330 and failure branch 332. However, other nodes 304 when added to software process flow 324 may or may not create branches. For example, some nodes 304 may be other types of nodes such as endpoint nodes, placeholder nodes, mock nodes, active nodes, passive nodes, error tolerant nodes, data gathering nodes, reference nodes, pointers, links, and the like.

Figure 3C:
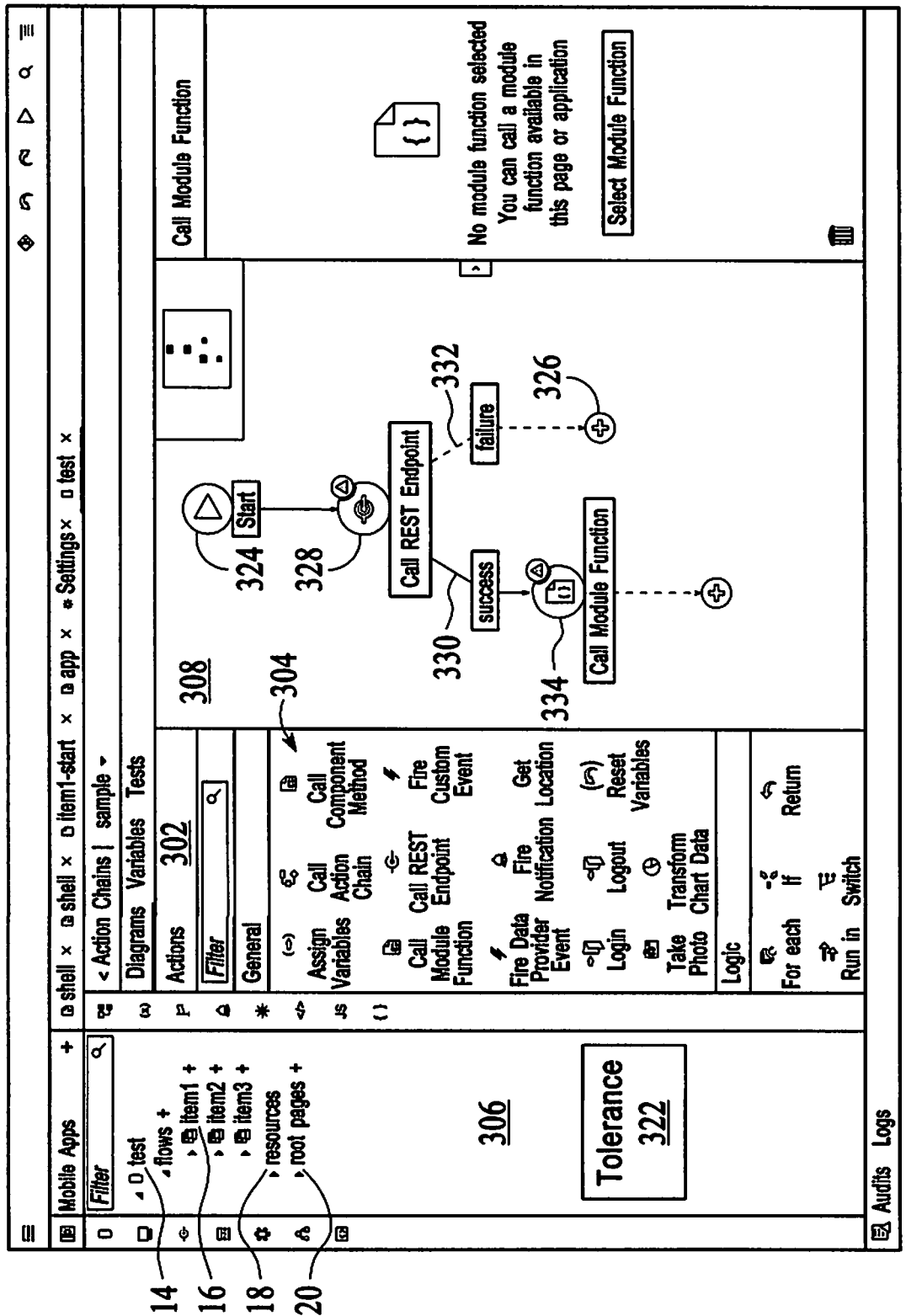
FIG. 3C illustrates a high-level user interface in a third state for testing software process flows.

FIG. 3C illustrates a high-level user interface 300 in a third state for testing software process flows. In some implementations, as illustrated, nodes 304 may be added to create an overall function for a branch, such as success branch 330. Here, for example, a call module function node 334 is added to success branch 330. Under this example software process flow 324, for a given input to call REST endpoint node 328, a successful input logic would direct the test along software process flow 330 to call module function node 334 to, for example, process data received. In this particular example scenario, such software process flow 324 may emulate and test a function of mobile device UI 314, where a successful result of operating a feature or aspect of mobile device UI 314 may result in calling a module function represented by module function node 334.

Figure 3D:
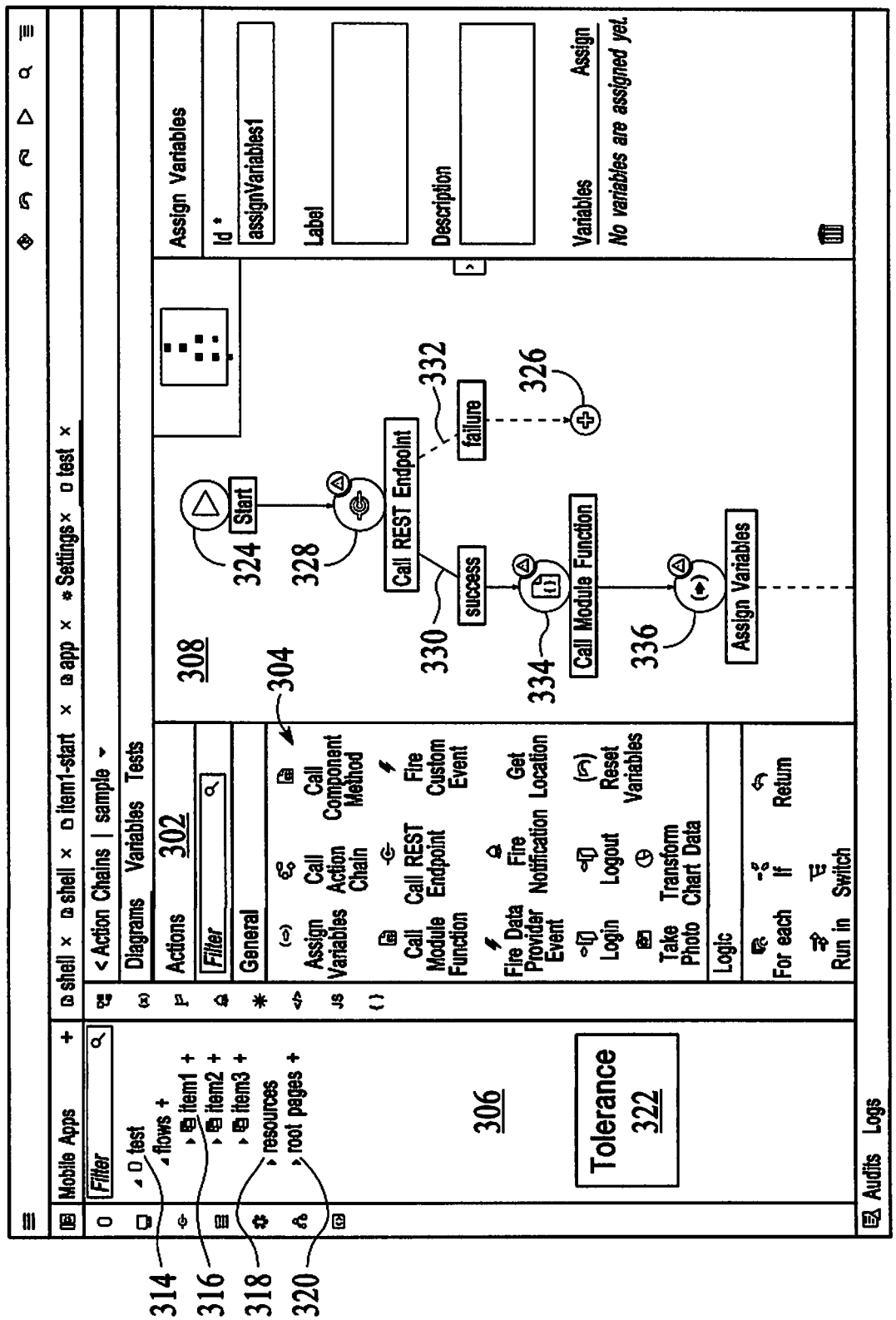
FIG. 3D illustrates a high-level user interface in a fourth state for testing software process flows.

FIG. 3D illustrates a high-level user interface 300 in a fourth state for testing software process flows. In some implementations, as illustrated, nodes 304 may be added and/or subtracted to define an overall function for a branch, such as success branch 330. Here, for example, an assign variable node 336 is added to success branch 330. Under this example software process flow 324, for a given input to call REST endpoint node 328, a successful input logic would direct the data along software process flow 330 to call module function node 334 and then to assign variable node 336, to for example assign the data to a variable. In this particular example scenario, such software process flow 324 may test a function of mobile device UI 314, where a successful result of operating a feature or aspect of mobile device UI 314 may result in calling a module function represented by module function node 334 and then assigning a variable as directed by assign variable node 336.

Figure 3E:
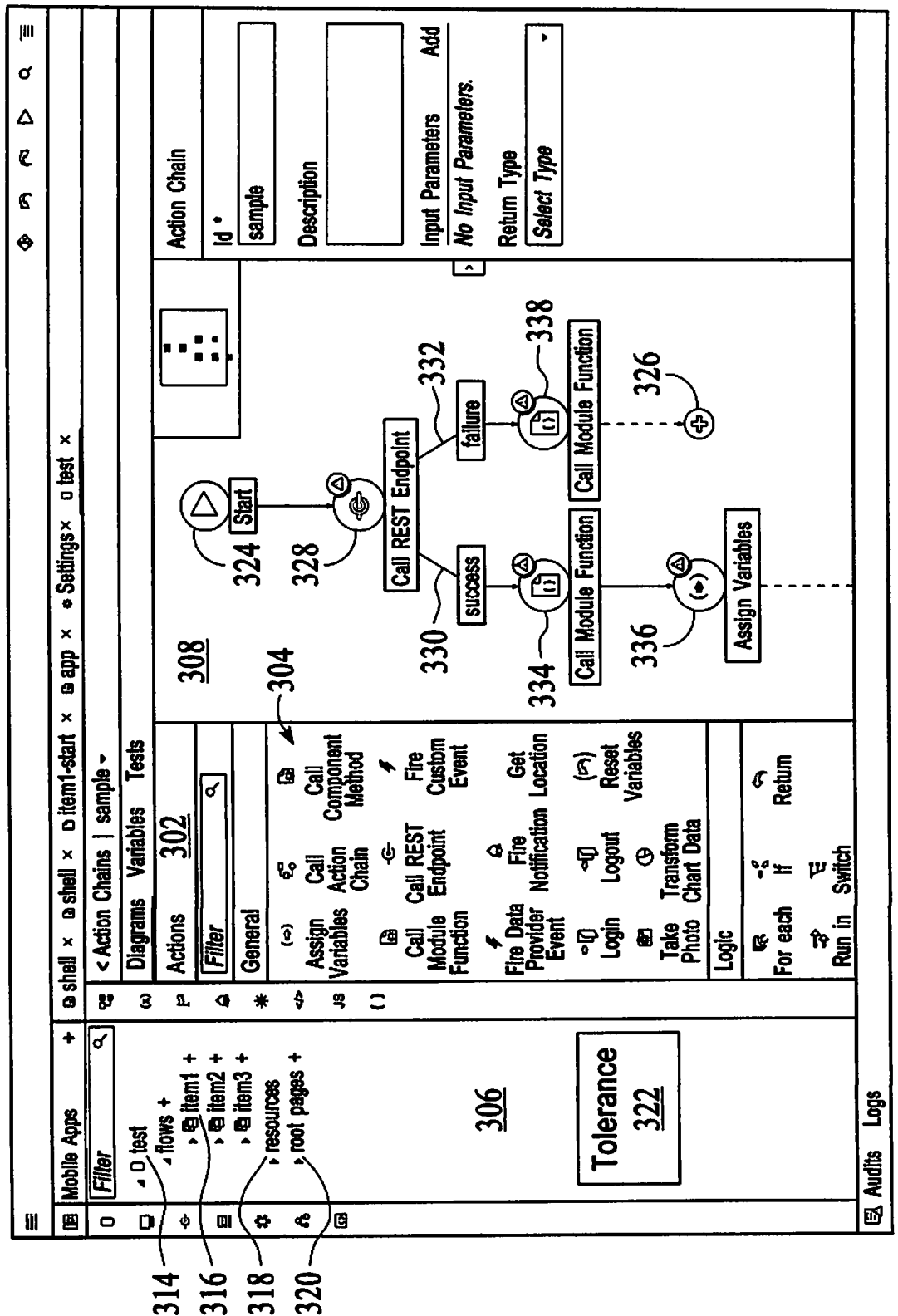
FIG. 3E illustrates a high-level user interface in a fifth state for testing software process flows.

FIG. 3E illustrates a high-level user interface 300 in a fifth state for testing software process flows. In implementations, as illustrated, nodes 304 may be added and/or subtracted to define an overall function for a branch, such as failure branch 332. Here, for example, a call module function node 338 is added to failure branch 332. Under this example software process flow 324, for a given input to call REST endpoint node 328, an unsuccessful or erroneous input logic may direct the test along software process flow 334 from call REST endpoint 328 to call module function node 338. In this particular example scenario, such software process flow 324 may test a function of mobile device UI 314, where a unsuccessful or erroneous result of operating a feature or aspect of mobile device UI 314 may result in calling a module function represented by module function node 338.

In other implementations, tolerance function 322 may be used to set one or more tolerance levels, tolerance values, tolerance thresholds, etc. for testing errors, test failures, and other testing anomalies. For example, referring to software process flow 324, tolerance function 322 may be employed to increase or decrease a tolerance to testing errors, test failures, and other testing anomalies by adjusting the tolerance of one or more nodes 304 employed in the software process flow 324. As an example, tolerance function may be a slider or widget that allows a user to adjust the tolerance to various inputs and outputs of software process flow 324 such that some inputs that normally would cause the process to take failure branch 328, would be directed to take success branch 330.

Under such scenarios, for example, a higher tolerance level errors that may be considered to be non fatal, such as spelling errors, syntax errors, font errors, missing characters, and the like, may either be corrected by tolerance function 322, or may be ignored and allowed to proceed as though the error, failure, or anomaly did not exist. In contrast, setting tolerance function 322 to a lower tolerance which may require more testing precision may place additional constraints to improve testing accuracy. Thus, tolerance function 322 may allow a system, such as software testing system 100, to be set to a more or less precise mode, which provides for testing precision flexibility.

In some implementations, such testing tolerance may be adjusted as a tradeoff with processing speed and/or efficiency. For example, increasing testing precision may require increasing or requiring increased processing power. In contrast, decreasing testing precision may require less processing power.

Figure 4:
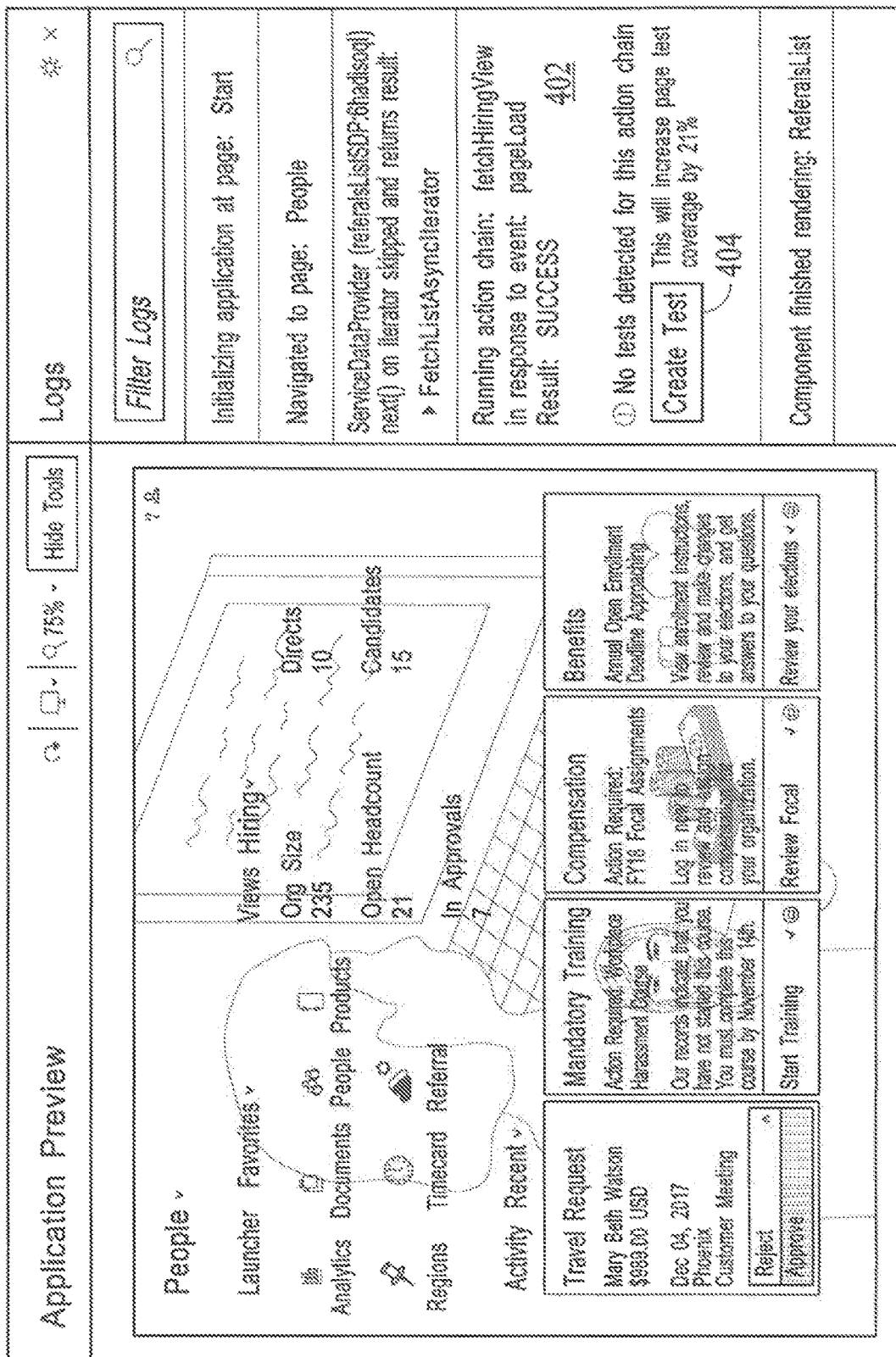
FIG. 4 is a high-level illustration of a user interface providing a preview of an application in use.

Referring to FIG. 4 which is a high-level illustration of a user interface 400 providing a preview of an application in use, and FIGS. 3A-E, in implementations, since software process flow 324 may provide a defined process, a system, such as software testing system 100, may use introspective analysis and knowledge about software process flow 324 to determine what the software process flow 324 will do with given inputs, and then assess aspects of such software process flow 324 such as whether the software testing process as designed is sufficient, insufficient, efficient, not efficient, robust, etc. In implementations, such assessment, analysis, and introspection may allow software testing system 100 to suggest to users to increase or decrease the number of tests, increase or decrease the number of software process flows 324, modify individual nodes 304 or software process flows 324, or otherwise adapt software testing of an application to meet or adapt to a variety of different testing criteria, external system variations, end user requests, system variations, etc.

In some scenarios, as illustrated, software process flow 324 may be configured, among other tasks, to ask for values that are being passed in and then use introspection to suggest what the output will be and ways to change the output as needed to produce expected output results. For example, such introspection and feedback may allow testing system 100 to suggest what to verify, suggest what to test (e.g. add to a test), generate a test where no further input by a user is required, and provide information as to why and the results of tests added and/or modified (e.g., the test will be 20% more efficient if the new test is added).

In implementations, when auditing running software, such introspection allows software testing system 100, for example, to use such external data to improve such testing suggestions thereby improving the overall testing process and application function. For example, as illustrated, UI 400 may provide the end user, among other data, people, activities, data views, logs, etc. In addition, UI 400 may also provide results of running software process flows, e.g. action chains in order to, for example, determine the level of testing for a particular application.

In some implementations, UI 400 includes UI 402 which may provide information pertaining to software process flows associated with an application presented by UI 400, such as whether any testing is or has been done on the software process flows associated with UI 400. Here, methods and systems described herein may configure a system, such as software testing system 100, to determine, for example, whether that the software application has had any tests performed for an associated software process flow and the coverage of such testing. In this illustration, UI 402 indicates that no tests were detected for a particular "action chain" (i.e. software process flow) associated with the software application. In response, software testing system 100 may analyze the software, data interactions, and other data, such as actual use cases by other users, as described herein, to provide a suggestion that creating a software test by selecting button 404, for example, a user may increase test coverage of the software, here, as illustrated, by a percentage such as 21%.

Figure 5:
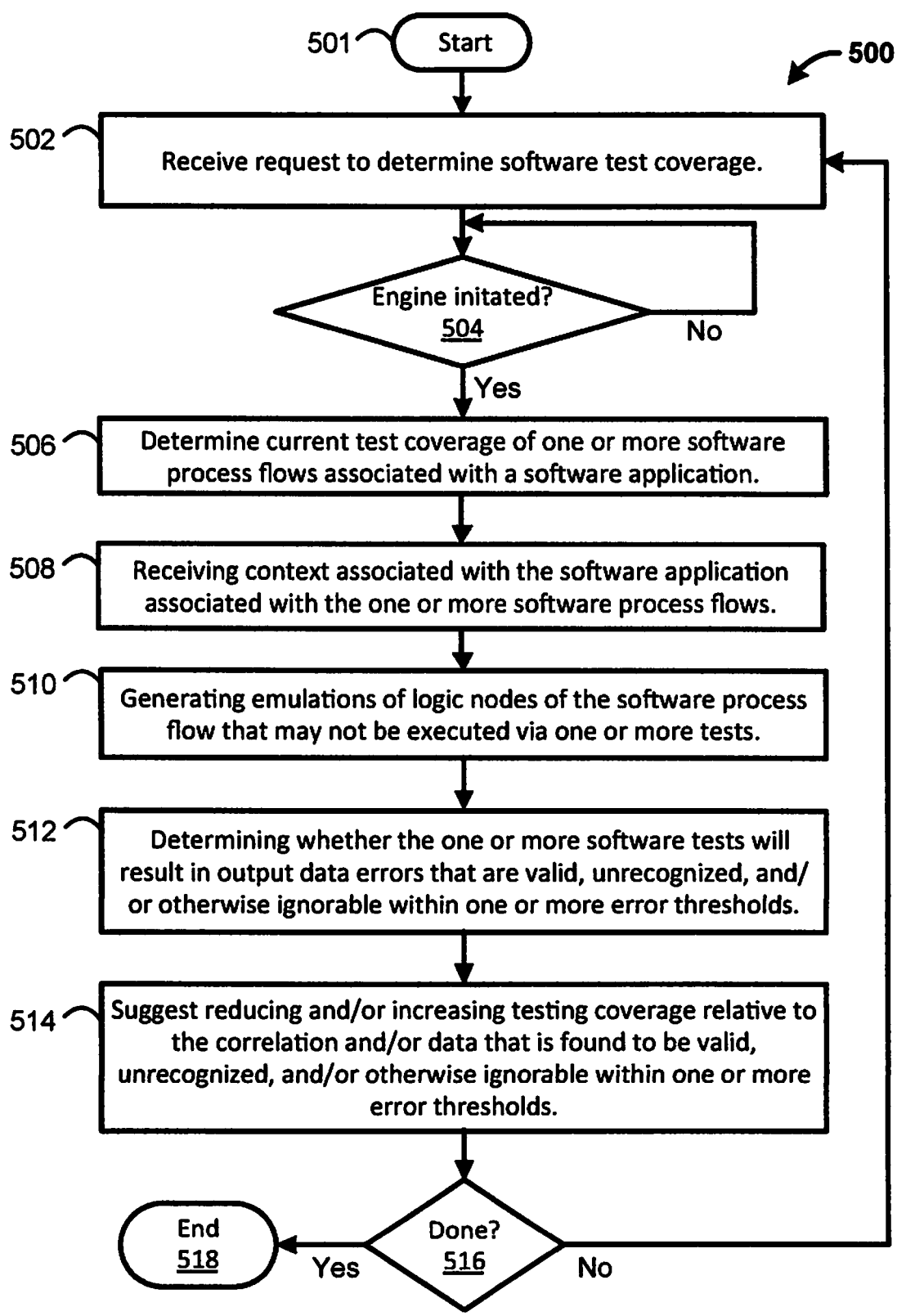
FIG. 5 illustrates a high-level flow diagram of an example method adapted for use with implementations, and variations thereof, described herein.

FIG. 5 is a flow diagram of an example method 500 adapted for use with implementations, and variations thereof, described herein. After initiation at 501, at 502, a system such as software testing system 110 may obtain user input from, for example, user input 114, or the like, providing a UI, etc. for accepting input to determine testing coverage of one or more software process flows, such as software process flow 324. At 504, method 500 determines whether an engine 504, such as software testing engine 116, has been initiated. If so, method 500 proceeds to 506. If not, method 500 returns to 504.

At 506, method 500 determines the current test coverage of one or more software process flows 324 associated with a software application. For example, as discussed above, method 500 may use introspective analysis and knowledge about software process flow 324 to determine what output or outputs the software process flow 324 will provide with a given set of defined inputs, and then assess testing coverage aspects of such software process flow 324 such as whether the software testing process 324 as designed provides sufficient, insufficient, efficient, not efficient, robust, etc. testing coverage relative to one or more test coverage thresholds.

At 508, method 500 receives context associated with the software application associated with the one or more software process flows 324. For example, as discussed herein, context may be derived from a number of sources including intended use of the software application, operating environment, e.g., Cloud based, mobile device environment, etc. user interactions with the software application, metadata, crash reports, user logs, social media, user comments, ratings, etc.

At 510, method 500 generates emulations of nodes 304 of the software process flow that may not be executed via one or more tests. For example, as some aspects of software process flow 324 may or may not be able to be provided such as a software REST call that requires authentication.

In other implementations, such emulation may be configured to emulate other types of nodes 304, that for example, would introduce anomalies into software process flow 324, fail upon activation or after a given amount of time has passed, send messages when a particular value is received and/or one or more thresholds are crossed, change to a different type of node 304 after activation, introduce a series of different actions, etc. in order to, for example, provide further stress testing to software process flow 324.

At 512, method 500 determines whether one or more software tests will result in output data errors that are valid, unrecognized, and/or otherwise ignorable within one or more error thresholds. For example, upon testing a UI button function and receiving an error, method 500 may determine that such error is irrelevant, ignorable, may cause failure, may introduce an instability, etc.

At 514, employing analysis and introspection method 500 may suggest reducing and/or increasing testing coverage relative to the correlation and/or data that is found to be valid, unrecognized, and/or otherwise ignorable within one or more error thresholds. For example, as illustrated in FIG. 4, method 500 may accept a signal from a user via button UI 404 to vary, create, or delete software tests in order to increase test cover (e.g., increase by 21% as illustrated) or decrease software testing coverage. In addition, method 500 may introspectively discern whether testing portions of software process flow should be increased, decreased, or left about the same, while other portions should have an increase or decrease in testing.

At 516, method 500 determines whether the session is finished. If not done, method 500 returns to 502. If so, method 500 ends at 518.

Thus, in implementations, employing such analysis and introspection may allow software testing system 100 and variants thereof to suggest to users to increase or decrease the number of tests, increase or decrease the number of software process flows 324, modify nodes 304, or otherwise adapt software testing of an application and/or process flows to meet or adapt to a variety of different testing criteria, external system variations, end user requests, system variations, etc. to increase or decrease the testing coverage for all or some of the application and associated software process flows 324.

Figure 6A:
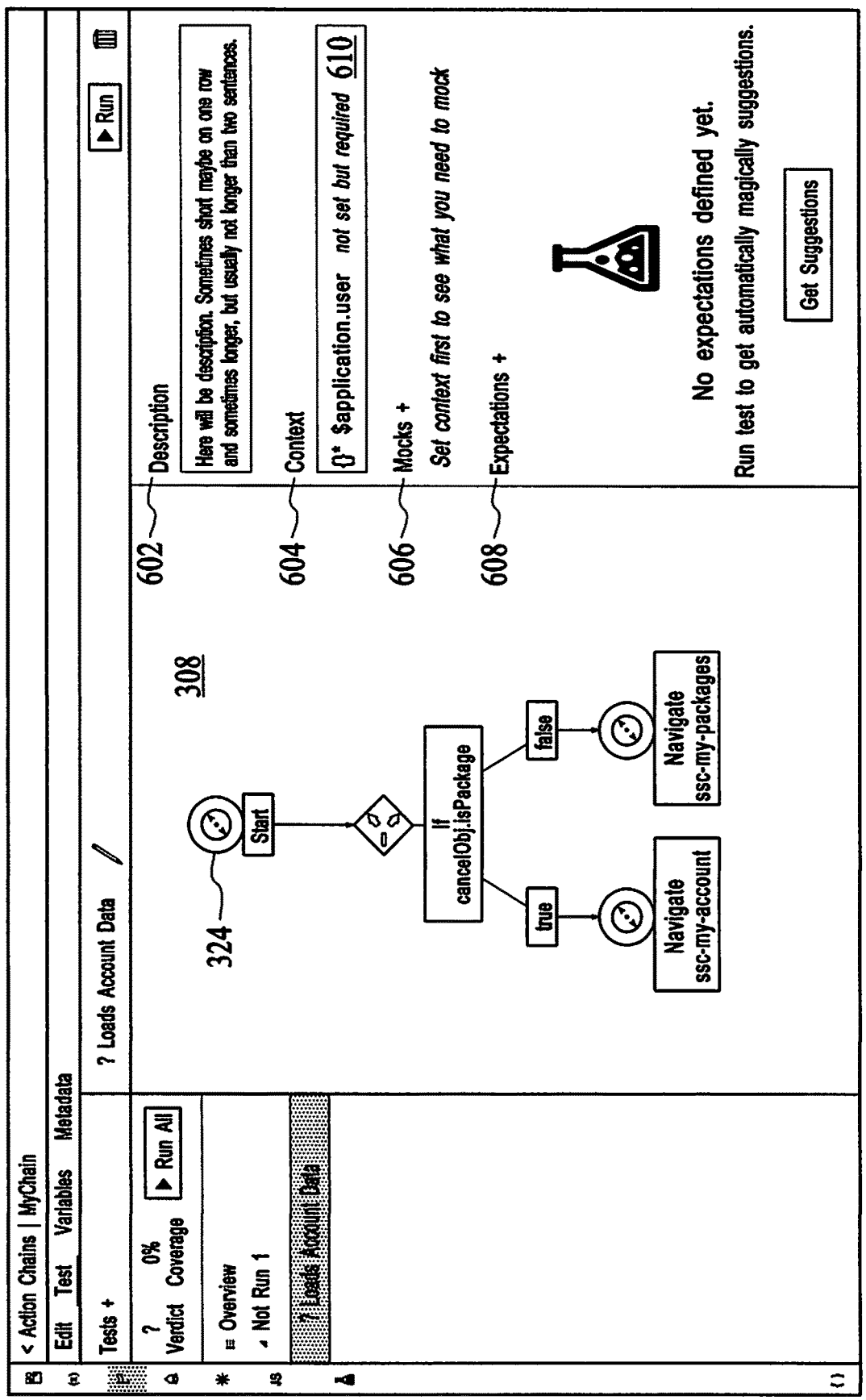
FIG. 6A illustrates a high-level user interface in a first state for testing software process flows.

FIG. 6A illustrates a high-level user interface 600 in a first state for testing software process flows with regard to receiving testing context, mocking software functions, expectations, and providing test coverage analysis data. In implementations, UI 300 as described herein includes UI 600. UI 600 includes UI 602, which is configured to present context UI 604, mock UI 606, and expectation UI 608. Context UI 604 may be configured to receive and process context information received from, for example, users, third parties, application metadata, source code, testing results, process flows, etc. via context entry UI 610 as described herein. In addition, context UI 604 may be employed to associate such context data to one or more software applications.

Figure 6B:
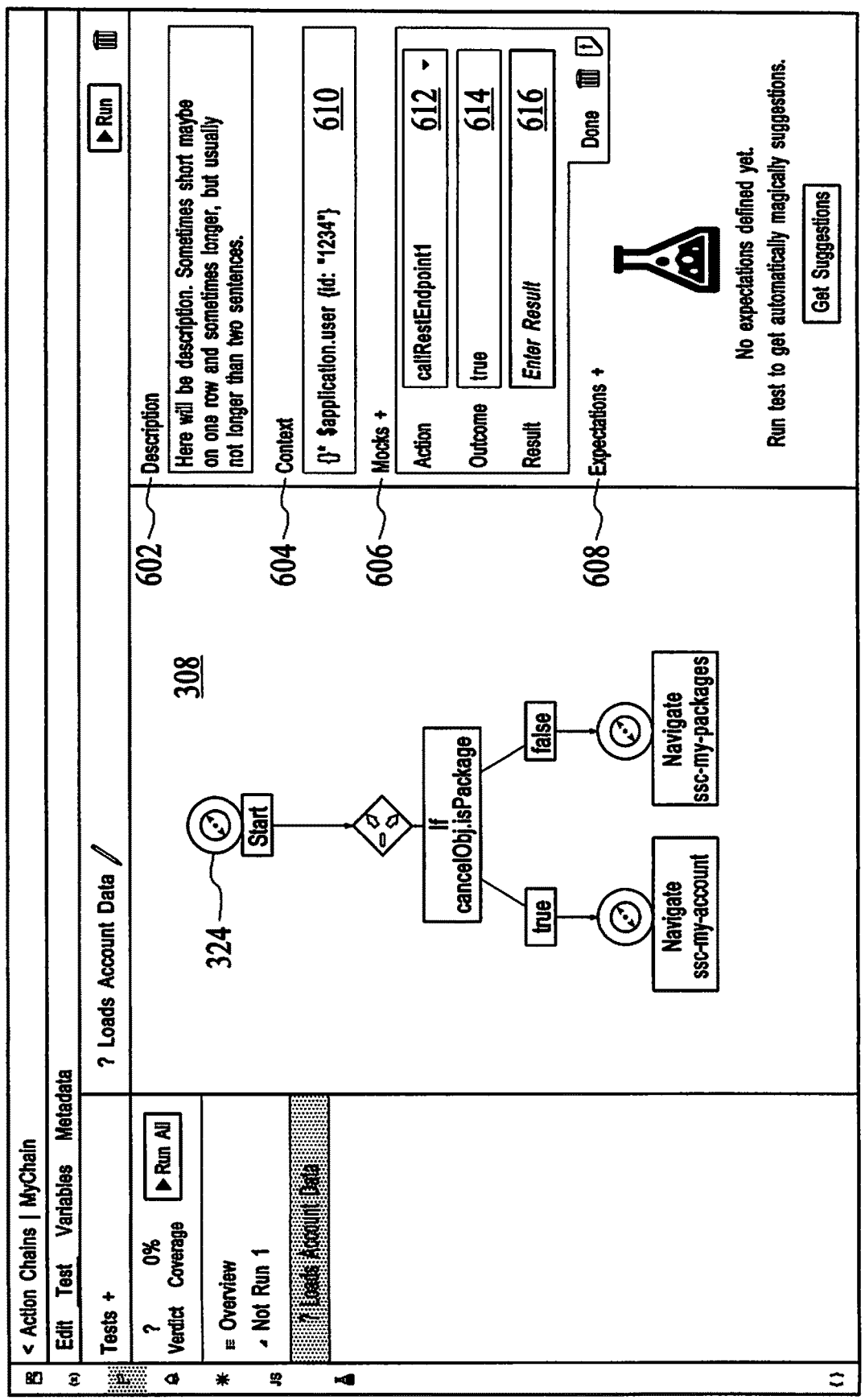
FIG. 6B illustrates a high-level user interface in a second state for testing software process flows.

FIG. 6B illustrates a high-level user interface 600 in a second state for testing software process flows with regard to receiving testing context, mocking functions, expectations, etc. via entry 610, and providing test coverage analysis data. In some implementations, mock UI 606 may be employed to generate nodes that "mock" or emulate a particular node, function, etc. that software tests may or may not be able to produce. Mock UI 606 may be configured to generate a node 304 that mocks or simulates a particular function, etc. for example to replace a defective node, add a node that has yet to be built, simulate a defective node, insert variation into the software process flows 324, etc. Moreover, mock UI 606 may be configured to insert an active or passive node 304 that may be used when some test or software operations have been met. For example, mock UI 606, may be used to add a node 304 that adds an anomaly to software process flow 324 after the software process flow 324 has been tested a given number of times, send a message when software process flow 324 receives a benign error, etc.

In some implementations, mock UI 606 includes an action UI 612, an outcome UI 614, and result UI 616. Action UI 612 allows a user to enter a particular action to emulate. For example, as illustrated, a "callRestEndpoint1" has been entered. Outcome UI 614 may be configured to allow a user to enter a desired outcome for a particular action. For example, as illustrated, a "true" output may be asserted given a call to the "callRestEndpoint1" node. Result UI 616 may be used to receive results, such as an expected result, unexpected result, a null result, and the like. For example, result UI 616 may be configured to provide a recommendation or suggestion to the user as to what to do with the result, such as "add test," "delete test", increasing testing, decrease testing, ignore test, etc.

Figure 6C:
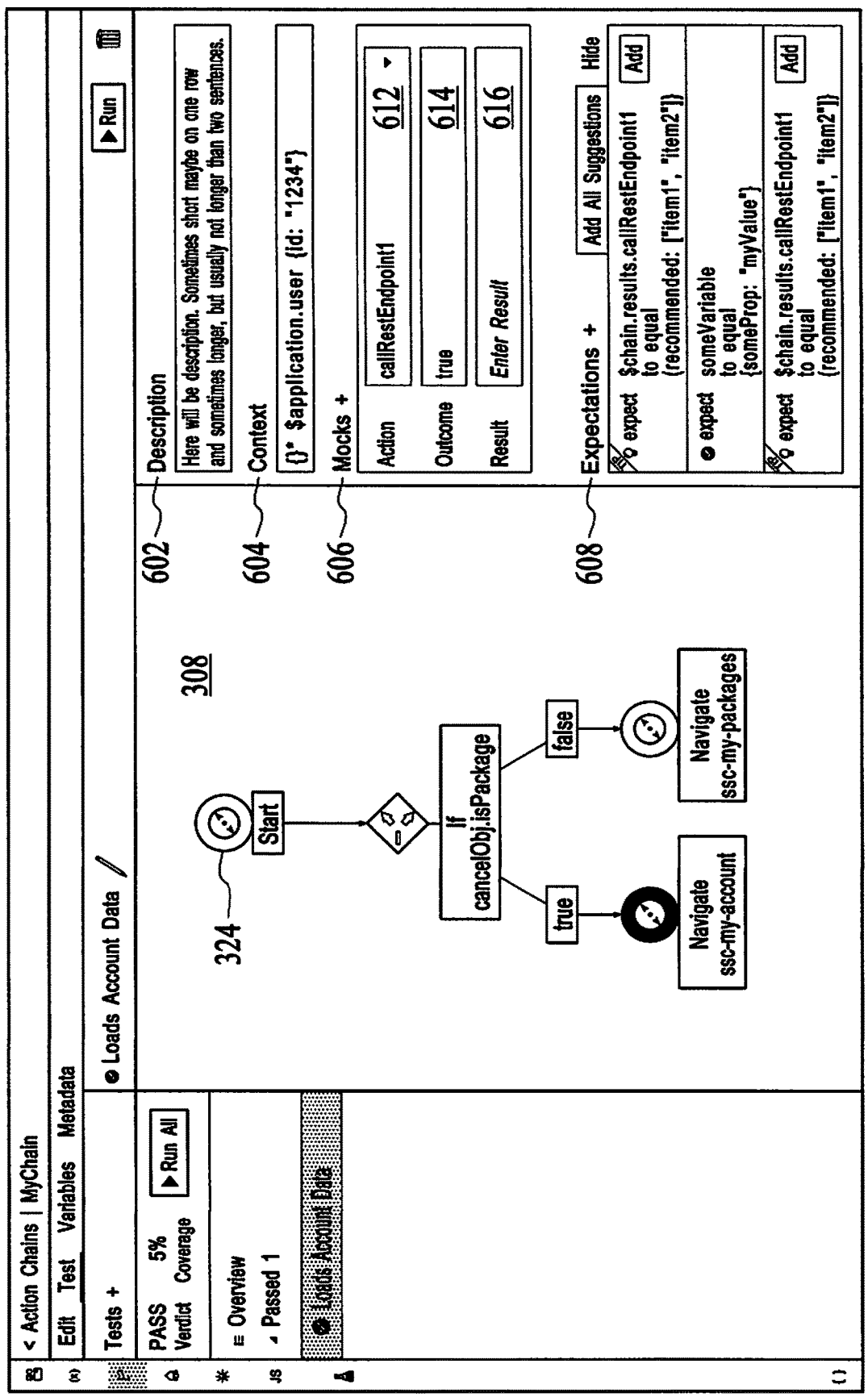
FIG. 6C illustrates a high-level user interface in a third state for testing software process flows.

FIG. 6C illustrates a high-level user interface 600 in a third state for testing software process flows with regard to receiving testing context, mocking functions, expectations, and providing test coverage analysis data. In implementations, expectations UI 608 may be used to provide "suggestions" (e.g., tips, advice, recommendations, etc.) based on the expected outcome of testing software process flows 324. Such suggestions may be used as predictors as to the results of testing software process flows 324 based on a configuration of nodes 304 and tests using a set of inputs. Moreover, such suggestions may allow a user, or system, such as software testing system 100, to assess results of tests, such as current and proposed tests, in order to discern, for example, the effectiveness of testing, the coverage of the testing, efficiency of tests, etc. Similar to result UI 616, expectations UI 608 may provide recommendations as part of the suggestions to help a user discern information and potential changes to testing of software process flow 324.

Figure 6D:
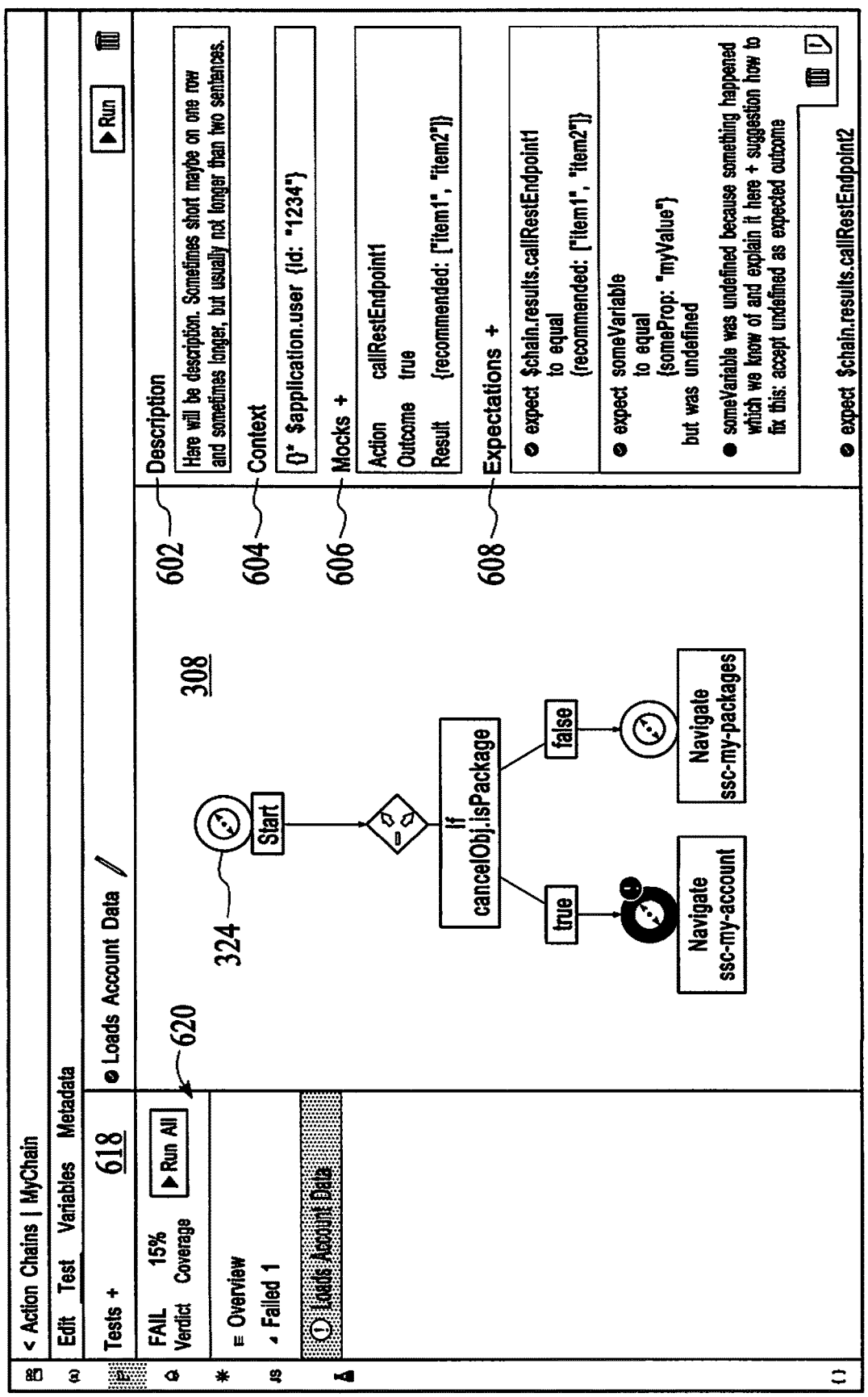
FIG. 6D illustrates a high-level user interface in a fourth state for testing software process flows.
Figure 6E:
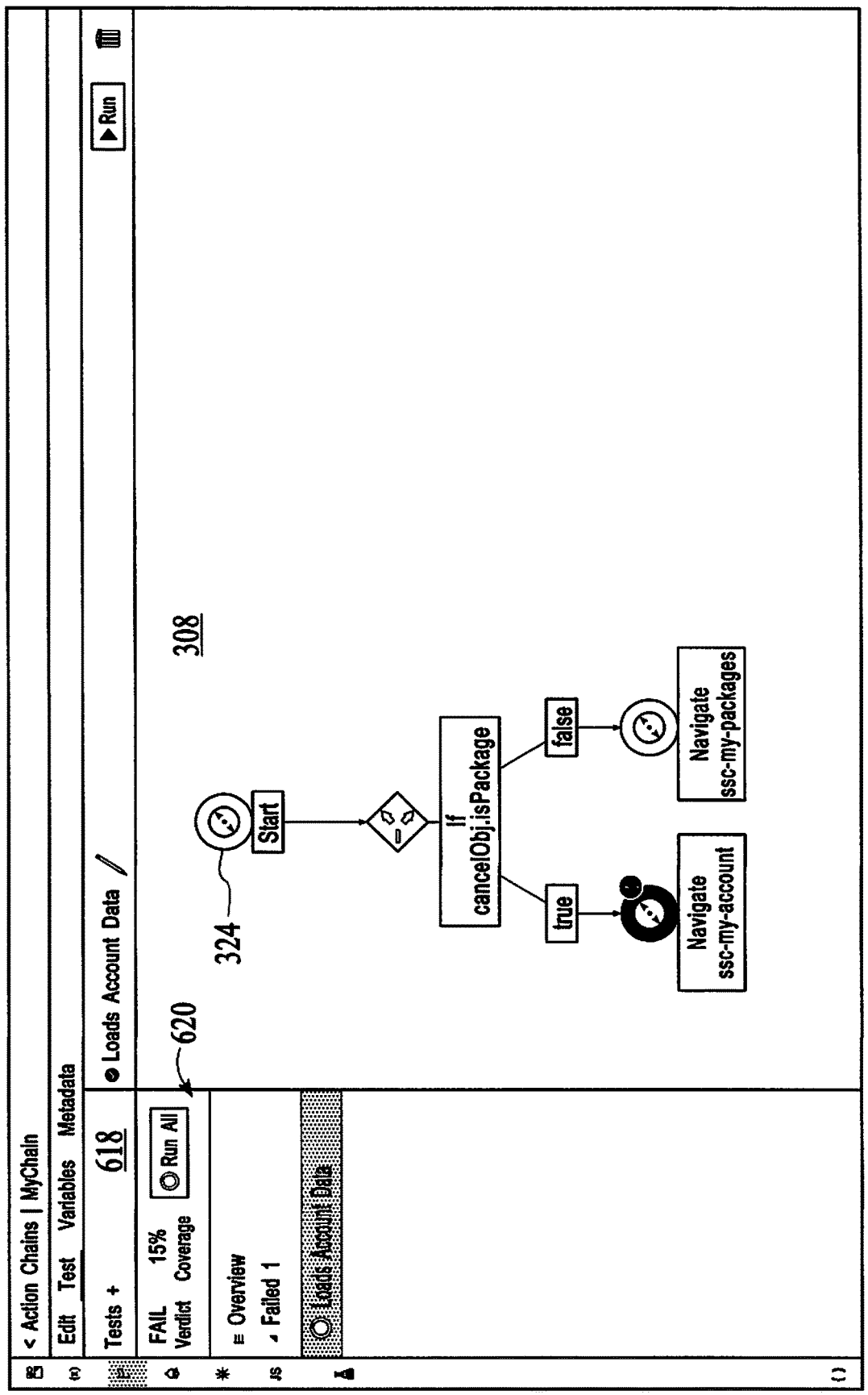
FIG. 6E illustrates a high-level user interface in a fifth state for testing software process flows.

FIG. 6D illustrates a high-level user interface 600 in a fourth state for testing software process flows with regard to receiving testing context, mocking functions, expectations, and providing test coverage analysis data. In implementations, UI 600 includes a test coverage UI 618 configured to provide information pertaining to the percentage of test coverage for a particular software process flow 324. For example, a system, such as software testing system 100 may provide a value or indicator, such as a percentage after analyzing the extent of testing provided by a particular set of tests testing one or more software process flows 324. Here, as illustrated, test coverage UI 618 provided a coverage percentage as "15%" provided by a current testing process of software process flow 324. In some implementations, a coverage widget 620 may be used to initiate a determination of testing coverage. However, as illustrated in FIG. 6E, coverage widget may be set to inactive, or to test a subset of software process flows 324, given a lack of criteria, such as context data, to fully determine testing coverage.

Although the description has been described with respect to particular embodiments thereof, these particular embodiments are merely illustrative, and not restrictive.

Figure 7:
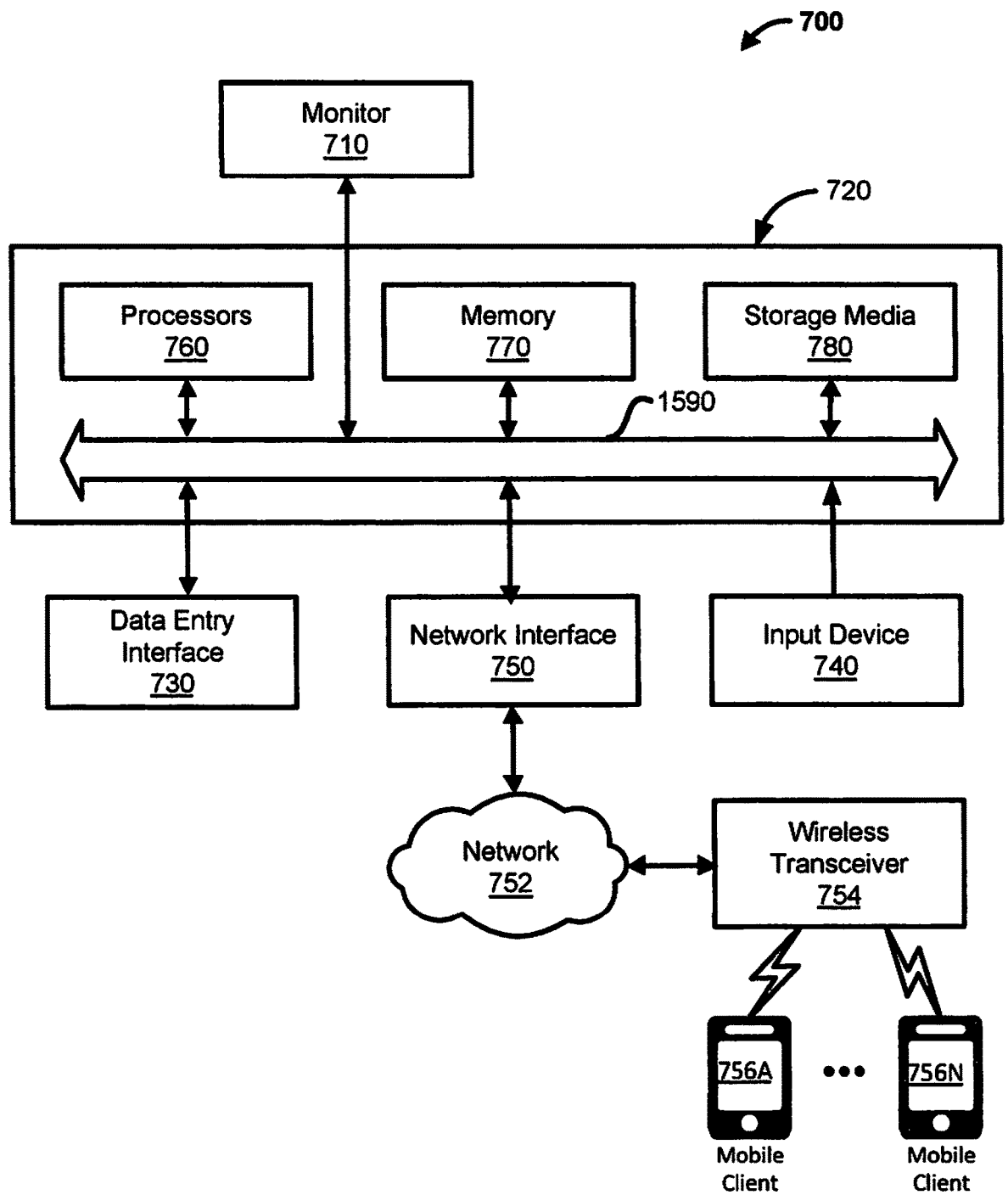
FIG. 7 is a high-level block diagram of an exemplary computer and communication system.

FIG. 7 is a block diagram of an exemplary computer system 700 for use with implementations described herein. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user (e.g., developer, customer, end user, etc.) to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as a processor 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 770 and Storage media 780 are examples of tangible non-transitory computer readable media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:

receiving a software process flow which includes a plurality of nodes representing software processing tasks associated with a software application;

analyzing the plurality of nodes to determine an output response of the software process flow relative to a plurality of defined inputs to the software process flow;

receiving at least some context data pertaining to the software process flow;

receiving a first set of software tests configured to test at least a portion of the software process flow, wherein a first software test of the first set of the software tests specifies user interactions;

analyzing the output response of the software process flow relative to the context data and the first set of software tests to determine which portion of the software process flow is tested;

determining from the context data, the first set of software tests, the output response, and the portion of the software process flow tested, a testing suggestion to vary the first set of software tests to change the portion of the software process flow tested;

presenting the testing suggestion that was determined based on the context data, the first set of software tests, the output response, and the portion of the software process flow tested, wherein the plurality of nodes includes a first node and the first node is not executed via the first set of the software tests, and wherein the testing suggestion recommends emulation of the first node;

generating emulation of the first node of the plurality of nodes of the software process flow, wherein the first node is not executed via the first set of software tests;

in response to receiving acceptance of the testing suggestion, varying the first set of software tests to generate a second set of software tests to include the emulation of the first node while running the software process flow with the first set of software tests; and changing at least one of the software tests of the second set on the fly to include the emulation of the first node while running the software process flow with the second set of software tests.

2. The non-transitory computer readable medium of claim 1, wherein the software process flow comprises at least two logic branches, wherein at least one of the logic branches comprises a mock node.

3. The non-transitory computer readable medium of claim 1, wherein the context data comprises at least some data obtained from a plurality of end users of the software process flow.

4. The non-transitory computer readable medium of claim 1, wherein the context data comprises at least some data obtained pertaining to a type of software application the software process flow is associated with.

5. The non-transitory computer readable medium of claim 4, wherein the context data comprises at least some data obtained pertaining to a user device environment associated with the software application.

6. The non-transitory computer readable medium of claim 1, further comprising determining whether the first set of software tests is insufficiently testing the software process flow relative to a threshold level of testing.

7. The non-transitory computer readable medium of claim 1, further comprising determining whether the first set of software tests is overly testing the software process flow relative to a threshold level of testing.

8. The non-transitory computer readable medium of claim 1, further comprising analyzing logic associated with at least some of the nodes to determine a complexity level of the logic and adjusting the testing suggestion relative to the complexity level of the logic.

9. The non-transitory computer readable medium of claim 1, further determining whether the software process flow would produce errors.

10. The non-transitory computer readable medium of claim 9, wherein at least some of the errors are acceptable based on an error tolerance threshold.

11. A computer implemented method, comprising:
receiving a software process flow which includes a plurality of nodes representing software processing tasks associated with a software application;
analyzing the plurality of nodes to determine an output response of the software process flow relative to a plurality of defined inputs to the software process flow;
receiving at least some context data pertaining to the software process flow;
receiving a first set of software tests configured to test at least a portion of the software process flow, wherein a first software test of the first set of the software tests specifies user interactions;
analyzing the output response of the software process flow relative to the context data and the first set of software tests to determine which portion of the software process flow is tested;
determining from the context data, the first set of software tests, the output response, and the portion of the software process flow tested, a testing suggestion to vary the first set of software tests to change the portion of the software process flow tested;
presenting the testing suggestion that was determined based on the context data, the first set of software tests, the output response, and the portion of the software process flow tested, wherein the plurality of nodes includes a first node and the first node is not executed via the first set of the software tests, and wherein the testing suggestion recommends emulation of the first node;
generating emulation of the first node of the plurality of nodes of the software process flow, wherein the first node is not executed via the first set of software tests;
in response to receiving acceptance of the testing suggestion, varying the first set of software tests to generate a second set of software tests to include the emulation of the first node while running the software process flow with the first set of software tests; and
changing at least one of the software tests of the second set on the fly to include the emulation of the first node while running the software process flow with the second set of software tests.

12. The method of claim 11, wherein the software process flow comprises at least two logic branches, wherein at least one of the logic branches comprises a mock node.

13. The method of claim 11, wherein the context data comprises at least some data obtained from a plurality of end users of the software process flow.

14. The method of claim 11, wherein the context data comprises at least some data obtained pertaining to a type of software application the software process flow is associated with.

15. The method of claim 14, wherein the context data comprises at least some data obtained pertaining to a user device environment associated with the software application.

16. The method of claim 11, further comprising determining whether the first set of software tests is insufficiently testing the software process flow relative to a threshold level of testing.

17. The method of claim 11, further comprising determining whether the first set of software process tests is overly testing the software process flow relative to a threshold level of testing.

18. The method of claim 11, further comprising analyzing logic associated with at least some of the nodes to determine a complexity level of the logic and adjusting the testing suggestion relative to the complexity level of the logic.

19. The method of claim 11, further determining whether the software process flow would produce at least some errors and wherein at least some of the errors are acceptable based on an error tolerance threshold.

20. An apparatus for testing software instantiated in a computing environment, the computing environment comprising one or more computing devices in communication with a utility that executes software configured to test software applications accessible to the one or more computing devices, the apparatus comprising:
one or more processors; and
memory storing instructions that, when executed by the one or more processors, cause the apparatus to:
receive a software process flow which includes a plurality of nodes representing software processing tasks associated with a software application;

analyze the plurality of nodes to determine an output response of the software process flow relative to a plurality of defined inputs to the software process flow;

receive at least some context data pertaining to the software process flow;

receive a first set of software tests configured to test at least a portion of the software process flow, wherein a first software test of the first set of the software tests specifies user interactions;

analyze the output response of the software process flow relative to the context data and the first set of software tests to determine which portion of the software process flow is tested;

determine from the context data, the first set of software tests, the output response, and the portion of the software process flow tested, a testing suggestion to vary the first set of software tests to change the portion of the software process flow tested;

present the testing suggestion that was determined based on the context data, the first set of software tests, the output response, and the portion of the software process flow tested, wherein the plurality of nodes includes a first node and the first node is not executed via the first set of the software tests, and wherein the testing suggestion recommends emulation of the first node;

generate emulation of the first node of the plurality of nodes of the software process flow, wherein the first node is not executed via the first set of software tests;

in response to receiving acceptance of the testing suggestion, vary the first set of software tests to generate a second set of software tests to include the emulation of the first node while running the software process flow with the first set of software tests; and change at least one of the software tests of the second set on the fly to include the emulation of the first node while running the software process flow with the second set of software tests.

* * * * *

UNITED STATES PATENT AND TRADEMARK OFFICE
CERTIFICATE OF CORRECTION

| | | |
|---|---|---|
| PATENT NO. | : 11,797,427 B2 | |
| APPLICATION NO. | : 16/687298 | |
| DATED | : October 24, 2023 | |
| INVENTOR(S) | : Straub et al. | |

It is certified that error appears in the above-identified patent and that said Letters Patent is hereby corrected as shown below:

In the Drawings

On sheet 2 of 15, in FIG. 2, under Reference Numeral 204, Line 1, delete "initated" and insert -- initiated --, therefor.

On sheet 9 of 15, in FIG. 5, and on the Title Page, the illustrative print figure, under Reference Numeral 504, Line 1, delete "initated" and insert -- initiated --, therefor.

In the Specification

In Column 7, Line 23, delete "endpoint,"" and insert -- endpoint, --, therefor.

In Column 13, Line 16, delete "Storage" and insert -- storage --, therefor.

Signed and Sealed this
Eleventh Day of June, 2024

Katherine Kelly Vidal
*Director of the United States Patent and Trademark Office*